United States Patent Office 3,216,992
Patented Nov. 9, 1965

3,216,992
7-GLYCINE BRADYKININ AND INTERMEDIATES FOR THE PRODUCTION THEREOF
Miklos Bodanszky, Princeton, Miguel A. Ondetti, Highland Park, and John T. Sheehan, Middlesex, N.J., assignors to Olin Mathieson Chemical Corporation, New York, N.Y., a corporation of Virginia
No Drawing. Filed Apr. 16, 1962, Ser. No. 187,987
6 Claims. (Cl. 260—112.5)

This invention relates to new peptides, and more particularly to the new nonapeptide, L-arginyl-L-prolyl-L-prolyl - glycyl - L - phenylalanyl-L-seryl - glycyl-L-phenylalanyl-L-arginine (hereinafter called 7-glycine bradykinin); and new intermediates useful in the preparation thereof.

The final product of this invention is a biologically active material, which possesses the same qualitative activities as does bradykinin. The fact that the compound does have such activity is surprising, since it is well known that the biological activity of bradykinin is strictly dependent on the total structure of the compound and that even minor deviations from this structure lead to a complete loss or a substantial decrease in activity [Guttman et al., Helv. Chim. Acta, 44, 1713 (1961)].

The final product of this invention is prepared, according to the processes of this invention, from simpler peptides, as more fully detailed in the following examples.

The following examples illustrate the invention (all temperatures being in centigrade):

EXAMPLE 1

*Methyl benzyloxycarbonyl-glycyl-L-phenylalanyl-nitro-L-arginate*

To a suspension of 8.24 g. of methyl benzyloxycarbonyl-L-phenylalanyl-nitro-L-arginate [J.A.C.S. 78, 238 (1956)] in acetic acid (60 ml.) is added a solution of hydrobromic acid in acetic acid (64 ml.). After one hour at room temperature the clear solution is diluted with acetic acid and freeze dried. The residue is dissolved in dimethylformamide (24 ml.) together with benzyloxycarbonylglycine p-nitrophenyl ester (5.7 g.) and the solution made alkaline with a mixture of tributylamine (8 ml.) and triethylamine (1 ml.). After six days at room temperature the mixture is diluted with ethyl acetate, washed twice with normal hydrochloric acid and finally with water. The organic layer is dried and concentrated to dryness and the oily residue triturated with ether until it becomes solid. For purification this solid is dissolved in hot acetonitrile, and precipitated with ether. The oil thus obtained is dissolved in hot ethyl acetate and hexane is added until slight turbidity. On cooling the product precipitates as an amorphous solid (about 6.1 g.) of M.P. about 110–112° (flows at about 116°).

*Analysis.*—Calcd. for $C_{26}H_{33}N_7O_{81}$: C, 54.63; H, 5.82; N, 17.15. Found: C, 54.95; H, 5.94; N, 17.38.

EXAMPLE 2

*Benzyloxycarbonyl-L-phenylalanyl-L-serine*

To a solution of L-serine (1.57 g.) in a mixture of water (25 ml.) and pyridine (25 ml.) is added benzyloxycarbonyl-L-phenylalanine p-nitrophenyl ester (6.3 g.) in small portions at a time, while the pH is kept constant at 8.7 by controlled addition of 4 N sodium hydroxide (in total 5.5 ml.). After 16 hours the clear yellow solution obtained is diluted with water (to 150 ml.), saturated with sodium bicarbonate and washed several times with ethyl acetate. The aqueous layer is acidified and extracted four times with ethyl acetate. The organic phase is washed once with water, dried over magnesium sulfate and concentrated to dryness. The crystalline residue is taken up with a mixture of ethyl acetate and ether (1:4), filtered and washed with ether. About 3.8 g., of product M.P about 155–156° (sint. 154), is obtained.

*Analysis.*—Calcd. for $C_{20}H_{22}N_2O_6$: C, 62.16; H, 5.74; N, 7.25. Found: C, 62.04; H, 5.58; N, 7.25.

EXAMPLE 3

*Methyl benzyloxycarbonyl-L-phenylalanyl-L-seryl-glycyl-L-phenylalanyl-nitro-L-arginate*

To a suspension of benzyloxycarbonyl-L-phenylalanyl-L-serine (386 mg.) and N-ethyl-5-phenylisoxazolium-3'-sulfonate (253 mg.) in acetonitrile (4 ml.) is added triethylamine (0.16 ml.) and the mixture stirred in an ice-water bath until a clear solution is obtained (2 hours). The resulting solution is added to a solution of methyl glycyl-L-phenylalanyl-nitro-L-argininate hydrobromic (obtained from the hydrobromic acid-acetic acid treatment of 571 mg. of methyl benzyloxycarbonyl-glycyl-L-phenylalanyl-nitro-L-argininate) in a mixture of dimethylformamide (1 ml.) and triethylamine (0.2 ml.). The reaction mixture is stirred overnight at room temperature, when considerable amounts of precipitate are formed. The suspension is diluted with ethyl acetate, filtered, washed with ethyl acetate and ether and finally suspended in water, filtered again and washed with water. For further purification, it is dissolved in hot acetonitrile-water (9:1) where on cooling it separates as an amorphous solid. About 410 mg., of product M.P. about 146–148°, sintering since 130°, is obtained.

*Analysis.*—Calcd. fof $C_{38}H_{47}N_9O_{11}$: C, 56.65; H, 5.88; N, 15.63. Found: C, 56.51; H, 5.97; N, 15.30.

EXAMPLE 4

*Methyl benzyloxycarbonyl-L-prolyl-glycyl-L-phenylalanyl-O-acetyl - L - seryl - glycyl-L-phenylalanyl-nitro-L-argininate*

To a solution of methyl benzyloxycarbonyl-L-phenylalanyl-L-seryl-glycyl - L - phenylalanyl-nitro-L-argininate (405 mg.) in acetic acid (3 ml.) is added a solution of hydrobromic acid in acetic acid (3 ml.). After two and a half hours at room temperature ether is added and the solid, pale yellow precipitate which forms is washed several times with fresh ether, and finally dried in vacuo over sodium hydroxide. This solid residue is dissolved in dimethylformamide (1.5 ml.) together with benzyloxycarbonyl-L-prolyl-glycine p-nitrophenyl ester (260 mg.) and the solution made alkaline with a mixture of tributylamine (0.24 ml.) and triethylamine (0.05 ml.). After six days at room temperature the mixture is diluted with ethyl acetate-acetonitrile-water and the organic phase washed once with 0.2 N hydrochloric acid and twice with water. On evaporation to dryness an oily residue is obtained which upon treatment with fresh ethyl acetate turns into a solid.

About 210 mg. of product, M.P. about 168–170° sintering from 160° is obtained.

*Analysis.*—Calcd. for $C_{47}H_{19}N_{11}O_{14}$: C, 56.33; H, 5.93; N, 15.38. Found: C, 56.10; H, 6.21; N, 15.13.

EXAMPLE 5

*Methyl benzyloxycarbonyl-nitro-L-arginyl-L-prolyl-L-prolyl-glycyl - L - phenylalanyl-O-acetyl-L-seryl - glycyl-L-phenylalanyl-nitro-L-argininate*

To a suspension of methyl benzyloxycarbonyl-L-prolyl-glycyl-L-phenylalanyl - O - acetyl-L-seryl-glycyl-L-phenylalanyl-nitro-L-argininate (1 g.) in acetic acid (3 ml.) is added a solution of hydrobromic acid in acetic acid (3 ml.). After one hour at room temperature the clear solution is dropped into 200 ml. of ether. The white yellowish precipitate formed is washed by decantation with ether several times and finally dried in vacuo over sodium hydroxide. The residue thus obtained is dissolved in dimethylformamide (2 ml.) together with benzyloxycarbonyl-nitro-L-arginyl-L-proline p-nitrophenyl ester (0.63 mg.) and the solution made alkaline with a mixture of tributylamine (0.6 ml.) and triethylamine (0.1 ml.). After five days at room temperature the jellified reaction mixture is disintegrated under acetonitrile, filtered and washed with acetonitrile and dried.

EXAMPLE 6

*L-arginyl - L - prolyl-L-prolyl-glycyl - L - phenylalanyl-L-seryl-glycyl-L-phenylalanyl-L-arginine (7-glycine bradykinin)*

The protecting groups of methyl benzyloxycarbonyl-nitro-L-arginyl - L - prolyl-L-prolyl-glycyl-L-phenylalanyl-L-seryl-glycyl - L - phenylalanyl-nitro-L-argininate are removed by adding to a solution of 130 mg. of methyl benzoyloxycarbonyl-nitro-L-arginyl - L - prolyl-L-prolyl-glycyl-L-phenylalanyl - O - acetyl-L-seryl-glycyl-L-phenylalanyl-nitro-L-argininate in 2 ml. of methanol and 0.3 ml. of water, a solution of 2 N sodium hydroxide (0.15 ml.). After two hours at room temperature, 1 ml. of water is added. The solution is left for fifteen minutes at room temperature and then another ml. of water is added. After a total of two and one-half hours, the solution is acidified and kept overnight in the refrigerator. The supernatant is decanted and the residue is dissolved in a mixture of acetic acid-water (2:1) (12 ml.) and hydrogenated at normal pressure for 48 hours using 5% palladium on barium sulfate as a catalyst. After removal of the catalyst by filtration the solvents are removed in vacuo, the residue dissolved in water and freeze-dried.

The invention may be variously otherwise embodied within the scope of the appended claims.

What is claimed is:

1. L-arginyl-L-prolyl - L - prolyl-glycyl-L-phenylalanyl-L-seryl-glycyl-L-phenylalanyl-L-arginine.
2. Methyl benzyloxycarbonyl-glycyl - L - phenylalanyl-nitro-L-arginate.
3. Benzyloxycarbonyl-L-phenylalanyl-L-serine.
4. Methyl benzyloxycarbonyl -L- phenylalanyl-L-seryl-glycyl-L-phenylalanyl-nitro-L-arginate.
5. Methyl benzyloxycarbonyl-L-prolyl-glycyl-L-phenylalanyl-O-acetyl-L-seryl-glycyl - L - phenylalanyl - nitro-L-argininate.
6. Methyl benzyloxycarbonyl - nitro-L-arginyl-L-prolyl-L-prolyl-glycyl - L - phenylalanyl-O-acetyl-L-seryl-glycyl-L-phenylalanyl-nitro-L-arginate.

References Cited by the Examiner

Greenstein: Chemistry of the Amino Acids, vol 2, pages 887–901, 1068–1075 and 1048–1056 (1961).

Konzett: Nature, vol. 188, page 998 (1960).

Silva: Amer. J. Physio, vol. 156, pages 261–273 (1942).

LEWIS GOTTS, *Primary Examiner.*

LEON ZITVER, *Examiner.*